United States Patent [19]

Bane et al.

[11] Patent Number: 5,203,011

[45] Date of Patent: Apr. 13, 1993

[54] METHOD AND APPARATUS FOR ESTABLISHING VOICE AND TONE SIGNALLING COMMUNICATION IN A TRUNKED SYSTEM

[75] Inventors: Ronald L. Bane; Tanh Q. Van, both of Plantation, Fla.

[73] Assignee: Motorola, Inc., Schaumburg, Ill.

[21] Appl. No.: 577,176

[22] Filed: Sep. 4, 1990

[51] Int. Cl.[5] .............................................. H04Q 9/00
[52] U.S. Cl. .................................... 455/34.1; 379/63; 455/34.2; 455/54.2; 455/62; 455/63
[58] Field of Search ............... 455/33, 34, 38, 52–54, 455/56.1, 62, 63, 67.1, 33.1, 33.4, 34.1, 34.2, 54.2, 67.3, 67.4; 375/5; 370/110.1, 110.2; 379/59, 63

[56] References Cited

U.S. PATENT DOCUMENTS 4,553,262 11/1985 Coe .
4,578,815 3/1986 Persinotti .
4,612,415 9/1989 Zdunek .
4,692,945 9/1987 Zdunek ................................. 455/17
4,723,264 2/1988 Sausuta et al. .
4,939,746 7/1990 Childress ............................. 455/33
5,008,953 4/1991 Dahlin et al. ....................... 455/33

Primary Examiner—Reinhard J. Eisenzopf
Assistant Examiner—Chi H. Pham
Attorney, Agent, or Firm—Robert S. Babayi

[57] ABSTRACT

A communication system (100) is provided comprising a communication resource controller (110) wherein the likelihood of success for establishing synchronous digital communication with a communication unit (120) is substantially greater than the likelihood of success for establishing analog communication. The communication unit may establish analog communication after the communication resource controller receives a digital access code from the communication unit. The analog communication is deferred until the received signal strength from the communication resource controller is above a predetermined level which makes the establishment of analog communication substantially likely.

8 Claims, 5 Drawing Sheets

5,203,011

METHOD AND APPARATUS FOR ESTABLISHING VOICE AND TONE SIGNALLING COMMUNICATION IN A TRUNKED SYSTEM

TECHNICAL FIELD

This invention relates generally to the field of communication systems, in particular to establishing voice and tone signalling communication in a trunked communication system.

BACKGROUND

In today's point to point communications, trunked communication systems provide many advantages over conventional systems. The trunked communication systems provide efficient allocation of a limited number of communication channels to a large number of users. Additionally, many system features, such as telephone interconnect, may be easily incorporated into the trunked communication systems.

In a trunked communication system a communication resource controller and a plurality of communication units, such as portable and/or mobile two-way radios, communicate analog messages, i.e. voice and/or tone signalling, and synchronous digital data messages. The digital data messages having predetermined baud rate are communicated on one or more control channels. The analog messages, such as Dual Tone Multiple Frequency (DTMF) tones, are communicated on one or more voice channels.

In a trunked system, an analog communication is preceded by a digital communication. The communication resource controller upon reception of a digital inbound channel request from one of the communication units may allocate a voice channel to that communication unit if such a voice channel is available. The communication resource controller may only receive a digital inbound channel request during a predetermined access time interval. If an inbound channel request is received within the access time interval, a response is transmitted to the communication unit which either indicates allocation of an available channel or indicates that all channels are busy. Once an available channel is allocated, voice and/or tone signalling messages may be communicated on that channel.

Generally, because of error correcting routines digital communication is substantially more reliable than analog communication which lack such routines. Thus, a voice channel may successfully be allocated after the communication resource controller has received a digital channel request message, however, the subsequent analog communication, i.e., voice and tone signalling communication may fail, if the communication unit is situated in a proximity which makes analog communication impossible. The failure to establish analog communication may hamper effective communication and cause user frustration. Therefore, it is desirable to provide successful analog communication after a successful prior digital communication is established.

SUMMARY OF THE INVENTION

Briefly, in a communication system of the invention a communication resource controller and at least one communication unit are capable of communicating digital data, voice, and tone signalling messages. The likelihood of success for establishing digital communication is substantially greater than the likelihood of success for establishing analog communication. The communication unit communicates digital messages with the communication resource controller in a synchronous manner, and is capable of accessing the communication resource controller during a predetermined access time interval.

According to one embodiment of the invention, the communication unit measures received signal quality characteristic from the communication resource controller and compares it to a predetermined received signal quality characteristic which is determined to make analog communication substantially likely. The digital access request message is transmitted when analog communication with the communication resource controller is substantially likely.

In another embodiment the communication unit reduces transmitter power during the access time interval such that a substantially identical likelihood of success for establishing digital and analog communication is provided. In yet another embodiment, the communication unit delays transmission of the digital access request message during said access time interval such that a substantially identical likelihood of success for establishing digital and analog communication is provided. The communication unit after providing for identical likelihood of success in establishing analog communication periodically transmits the digital access request message until analog communication with the communication resource controller is established.

DETAILED DESCRIPTION OF THE PREFERRED EMBODIMENT

Figure 1:
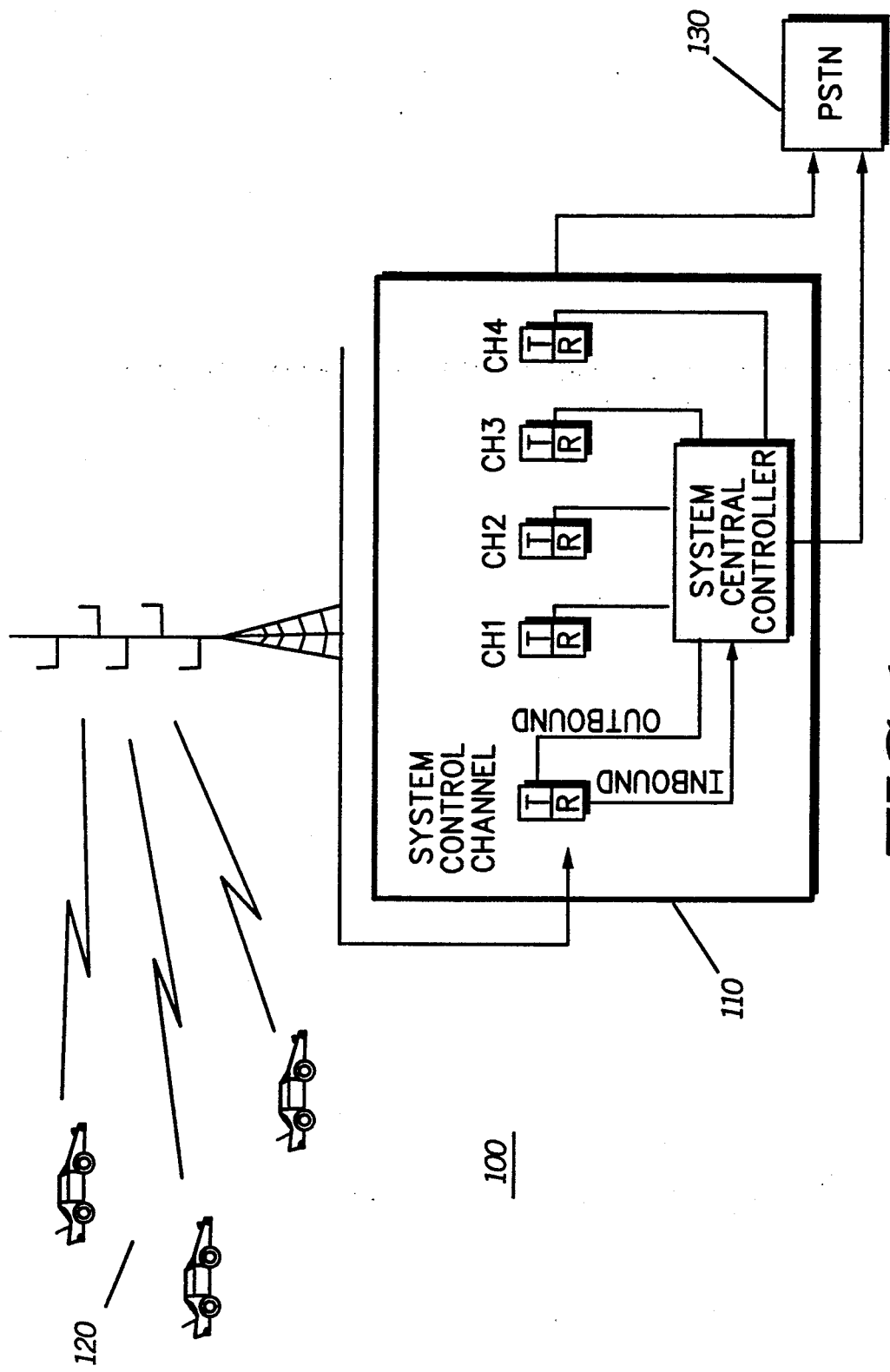
FIG. 1 illustrates a communication system which incorporates the features of the present invention.

Referring to FIG. 1, a preferred communication system 100 having incorporated therein the principals of the present invention is shown. The communication system 100 is a trunked communication system which includes a communication resource controller 110 and a plurality of communication units 120. In the preferred embodiment of the invention, the communication system 100 comprises a well known trunked system offered by Motorola Inc. The communication units 120 may comprise mobile and portable two-way radios, such as those manufactured by Motorola Inc. The overall operation of the communication system 100 is well known in the art, however, this operation to an extent necessary for understanding of the present invention will be described.

The communication resource controller 110 and the communication units 120 communicate digital data messages on a control channel and voice, tone signalling messages on a number of voice channels (channels 1-4). The communication resource controller 110 may transmit, on a transmit control channel, digital outbound signalling words (OSW) to the communication units 120. The OSW is a 84 bit word having a 3600 baud rate which is transmitted at a 23 msec time interval. The communication resource controller 110 may receive, on a receive control channel, a digital inbound signalling word (ISW) transmitted by the communication unit 120. The ISW is a 78 bit word also having a 3600 baud rate.

The ISW and OSW communicate those information which are required for the proper operation of the communication system 100. When the system is in an idle state, i.e. no voice communication is in progress, the communication unit 120 monitors the outbound control channel for back ground OSWs which are transmitted by the communication resource controller 110. The communication resource controller 110 also monitors the availability status of other voice channels. The background OSW contains such information as system identification and channel identification and informs the communication units that they are in the correct system. Moreover, the OSW messages provide synchronization mechanism between the communication resource controllers 110 and the communication units 120.

In order to establish voice communication, a digital ISW channel access request message is transmitted from the communication unit 120. The channel access ISW comprises information, such as fleet ID, unit ID, etc. The communication resource controller 110, if accessed within the duration of an access time interval, searches all the available voice channels, and upon availability allocates a channel to the communication unit 120. If an available channel is found a channel grant OSW is transmitted to the communication unit 120, and if an available channel is not found a channel busy OSW is transmitted. The channel grant OSW indicates the allocated voice channel number to all of the communication units 120 operating in the communication system 100. Upon reception of a valid OSW (i.e., channel grant or busy), the initiated call is processed. When a call is being processed all the communication units 120 which are assigned to the same fleet or subfleet as the originating communication unit 120 revert to the allocated voice channel and the initiated call may be processed and a voice communication may be established between the communication units 120.

The digital ISW messages may also comprise an access request for an available service, such as telephone interconnect service which allows the communication unit to establish communication with a public service telephone network (PSTN) 130. Once an ISW comprising a telephone interconnect access request is received by the resource controller 110 an available voice channel is allocated. Thereafter, tone signalling messages, such as DTMF, may be transmitted from the communication unit 120 to establish a tone signalling communication with the PSTN 130. Accordingly, the communication unit 120 transmits a digital access code (i.e., digital ISW) to the communication resource controller 110 within the access time interval and in response to a reception of a channel grant the analog communication may be established. The communication unit 120 activates an audio or visual alert means, if a channel busy OSW is received from the resource communication controller 110.

As referenced herein, a tone signalling and/or voice communication is intended to include any type of analog communication that the communication unit 120 may have within the communication system 100.

Figure 2:
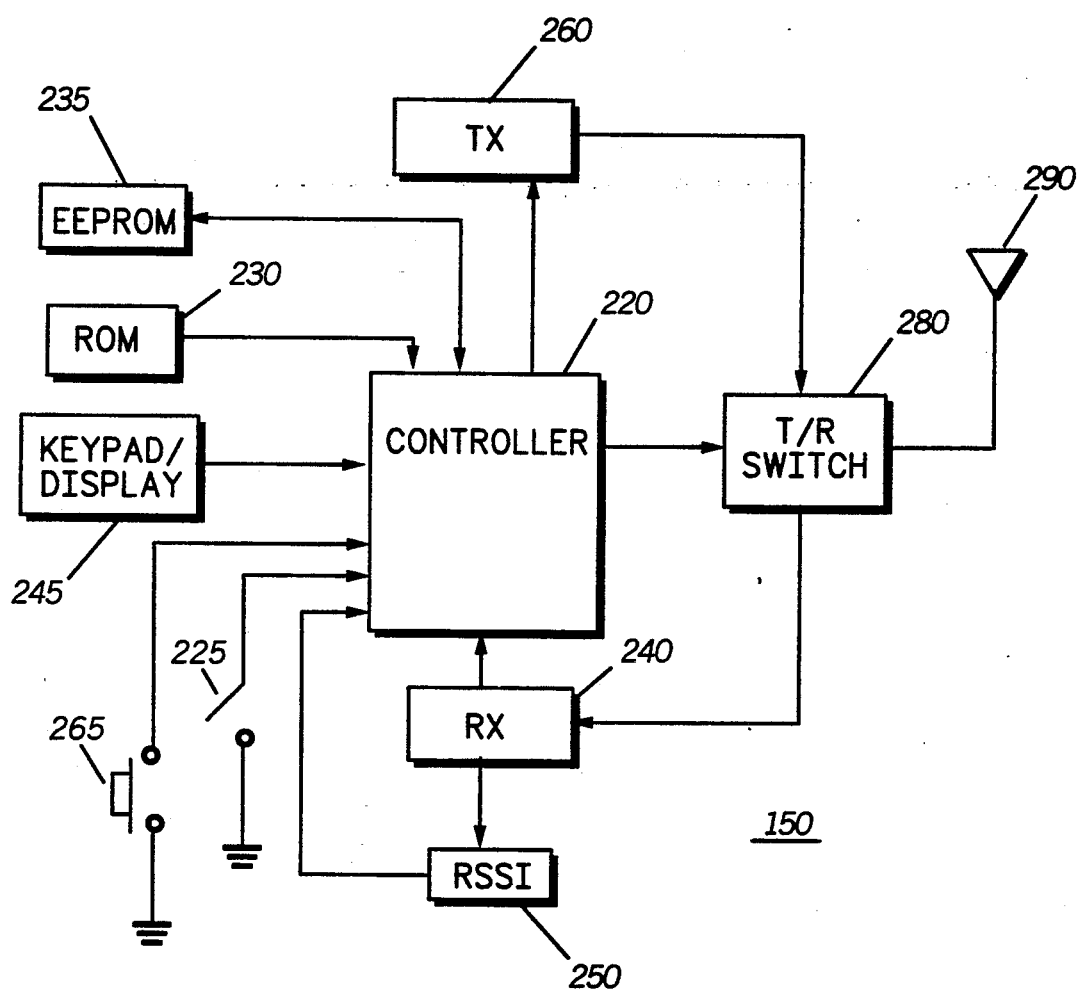
FIG. 2 is a block diagram of a communication unit utilized in the communication system of FIG. 1.

In the preferred embodiment of the invention, the communication units 120 comprise microprocessor controlled two-way trunked radios. Referring to FIG. 2, the block diagram of one such communication unit is shown. The communication unit 120 receives the digital OSW, and analog messages through an antenna 290 which is coupled to a T/R switch 280. In receive mode, the T/R switch 280 under the control of a controller 220 couples the antenna 290 to a receiver 240. The received signal may contain voice, data or OSW messages. The receiver 240 applies the received digital OSW to the controller 220 for processing. The controller 220 provides operational control and timing for the communication unit 120 by executing well known instructions which are stored in its Read Only Memory (ROM) 230. Upon decoding of the received messages, the controller 220 takes steps to effectuate proper operation of the communication unit 120. The controller 220 also receives a received signal strength indicator (RSSI) signal from a well known RSSI circuit 250. The RSSI signal level is proportional to the strength of the received signal. In transmit mode, the ISW messages are generated by the controller 220. The digital ISW messages as well as analog messages, (i.e. voice and tone signalling messages) are transmitted by a transmitter 260 the output power of which may be changed to a desired setting by the controller 220. The bits of data comprising personality of the communication unit 120 are stored in the EEPROM 235. This data, among other things, includes information which determine the operating frequency. The stored data may be programmed into the communication unit 120 during manufacturing in the factory or in the field by a well known field programmer (not shown). A user may initiate a voice communication by pressing a push to talk switch 255 or the user may initiate a tone signalling communication by activating a tone signalling activation means, such as a prone interconnect button 265. A keypad/display provides the interaction mechanism between a user and the communication unit 120. The keypad/display 245 may be used as dialing means for establishing the telephone communication with the PSTN 130 (shown in FIG. 1).

The likelihood of success in establishing digital communication via digital ISW is substantially greater than the likelihood of success in establishing the analog communication. This is because of the error correcting routines in the digital communication protocol between the communication unit 120 and the communication resource controller 110. In the preferred embodiment, the communication resource controller 110 may only be accessed for communication within a 3 bit access time interval which occurs immediately after completing transmission of an OSW. One of ordinary skill in the art by considering the baud rate of the system and the propagation speed of electromagnetic waves (the speed of light) may appreciate that duration of each digital bit of the ISW corresponds to substantially 25 miles of propagation for the signals carrying ISW or OSW. Thus, the communication units 120 may communicate digital data messages when positioned within a 75 miles range from the communication resource controller 110. However, due to the lack of error correction during analog communication, the messages may not be reliably communicated with the communication resource controller even though a prior digital communication has been established.

It is well known that the reliability of analog communication is directly proportional to dependability and effectiveness of communication coverage in the proximity at which the communication unit is positioned. For example, a better received signal characteristic being communicated between the resource controller 110 and the communication unit 120 provides a more reliable analog communication. Similarly, a closer range between the communication unit 120 and the communication resource controller 110 provides a more reliable analog communication.

Figure 3:
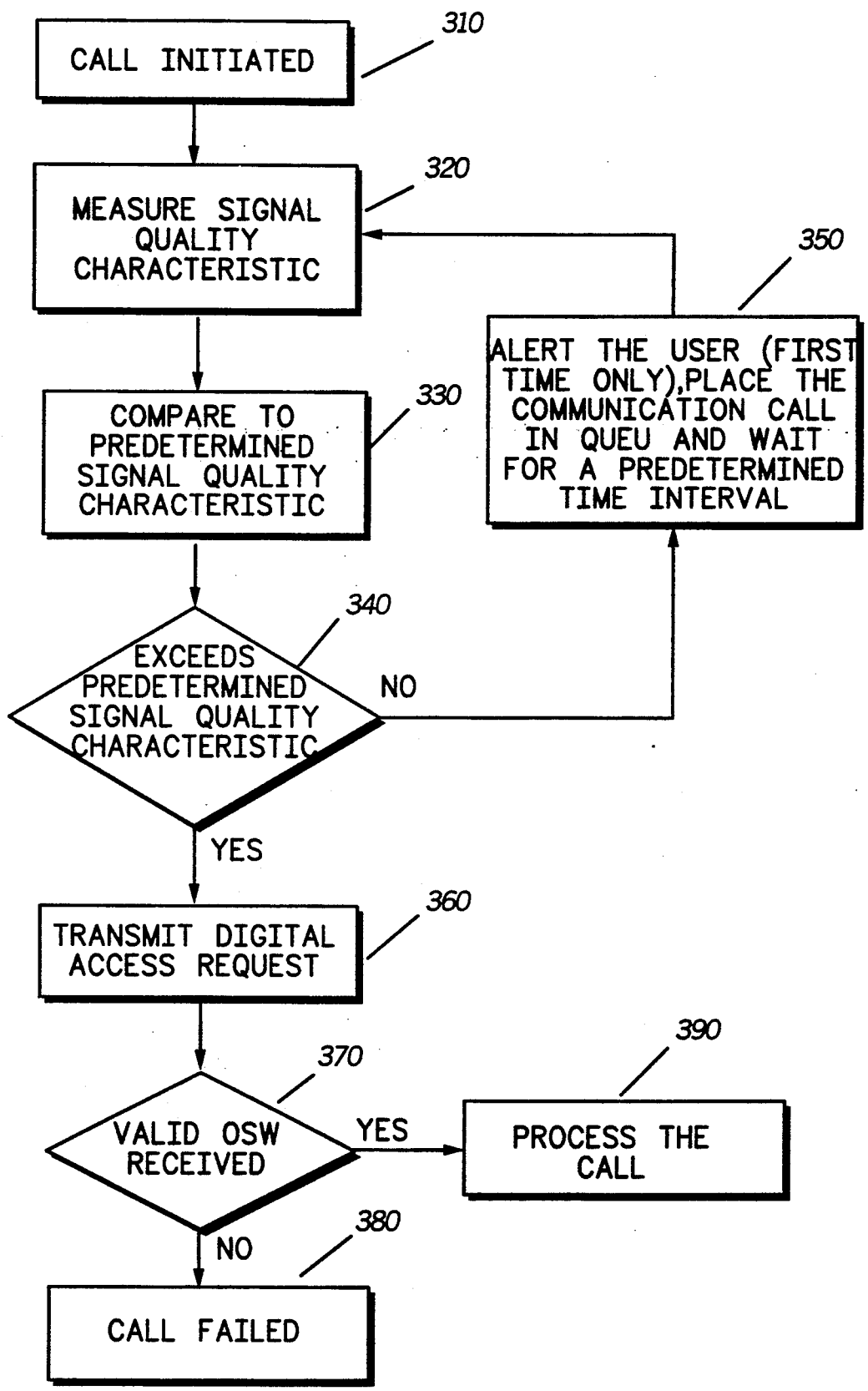
FIG. 3 is a flow chart of the steps taken for achieving the intended results of one embodiment of the present invention.

Referring to FIG. 3, the preferred flow chart of the operational steps for establishing tone signalling communication according to one embodiment of the invention is shown. In this embodiment of the invention, the analog communication are achieved by relying on a particular received signal quality characteristic, such as received signal strength, signal to noise ratio, or bit error rate. In the preferred embodiment, received signal strength level comprises the desired received signal quality characteristic of the background OSW which is communicated by the resource controller 110. After a voice and tone communication is initiated, block 310, the communication unit 120 measures the strength of the received signal via the RSSI circuit 250 (shown in FIG. 2), block 320. The communication unit 120 then compares the strength of the received signal to a predetermined received signal strength level, block 330. The predetermined signal strength level is set at a level which is determined to make establishing analog communication substantially likely. The predetermined signal strength level may be substantially equal to the level of a received signal at which digital and voice communication are both determined to succeed and may be selected based on the particular characteristics of the coverage area of the communication system 100. If the received signal strength level is below the predetermined level, the communication unit 120 determines that the analog messages may not be received by the communication resource controller 110, block 340. Therefore, the digital access request is not transmitted and deferred until the received signal strength is above the predetermined level. Therefore, the initiated communication call is placed in queue and operator is alerted via audio and visual indicator means, block 350. Thereafter, the communication unit 120 periodically compares the received signal strength level with the predetermined level. If the received signal strength level is above the predetermined level the communication unit determines that establishing the analog communication is substantially likely and the digital access request ISW is transmitted, block 360. If a valid OSW is received in response to transmission of the digital access request, the initiated communication call is processed, block 390. If a valid OSW is not received from the communication resource controller 110, then the call fails and the user is alerted, block 380. Accordingly, the digital access request is only transmitted when the communication unit based on the received signal characteristic determines that the tone signalling and/or voice communication with the communication resource controller is substantially likely. Similarly, instead of comparing the received signal strength level, the analog communication may be established by comparing signal to noise ratio or bit error rate to a predetermined signal to noise ratio or bit error rate which insures establishing analog communication is substantially likely.

In the preferred embodiment of the invention the predetermined signal strength level is stored in the EEPROM 235. The predetermined signal strength level may be stored in the EEPROM 235 permanently and may not be subject to modification. Alternatively, the predetermined signal strength level may be modifiable via the OSW messages transmitted from the communication resource controller 110. This arrangement is more desirable in those communication systems which utilize a plurality of communication resource controllers 110, thereby allowing the predetermined signal strength level to be modified in accordance with the characteristic of the coverage area within which the communication unit 120 is located.

Figure 4:
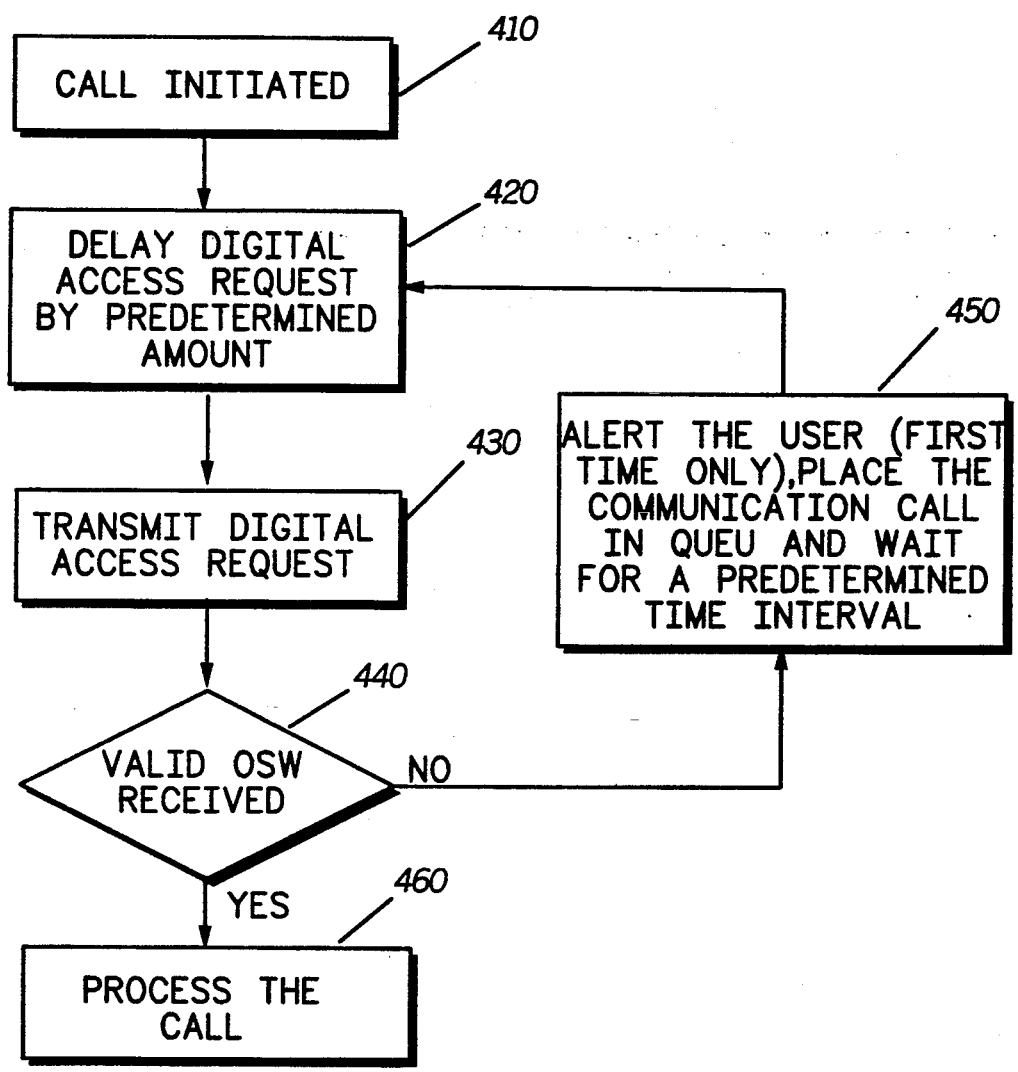
FIG. 4 is a flow chart of the steps taken for achieving the intended results of another embodiment of the present invention.

Referring to FIG. 4, the preferred flow chart of the operational steps according to another embodiment of the invention is shown. Because the timing of the communication unit 120 is continuously synchronized with the timing of the communication resource controller 110, a delay from transmission of the last OSW to reception of an ISW may be correlated with the range of the communication unit 120 from the communication resource controller 110. As described above, every bit delay corresponds to a 25 mile distance between the communication unit 120 and the communication resource controller 110 and accordingly, a 3 bit delay corresponds to 75 miles. At 75 miles distance, though sufficient for establishing digital communication may not be sufficient for establishing analog communication. According to this embodiment of the invention, after the call is initiated, block 410, the transmission of the digital access request is delayed during the access time interval such that a substantially identical likelihood of success for establishing digital communication and tone signalling communication is provided, blocks 420 and 430. The predetermined delay is selected based on the particular characteristics of the coverage area of the communication system 100 which insures establishment of successful analog communication. If after the transmission of the delayed digital access request a valid OSW is received from the resource communication controller the tone signalling or the voice communication is processed, blocks 440, and 460. If a valid OSW is not received, the initiated communication call is placed in queue and operator is alerted via audio and visual indicator means, block 450. Thereafter, the delayed digital access request is periodically transmitted until analog communication with the communication resource controller 110 is established. It may be appreciated that based on any criteria, such as passage of a predetermined time interval, the attempts to establish analog communication may be aborted. In the preferred embodiment of the invention, the predetermined time delay is stored in the EEPROM 235. The predetermined time delay may be stored in the EEPROM 235 permanently and may not be subject to modification. Alternatively, the predetermined delay may be modifiable via the OSW messages transmitted from the communication resource controller 110.

Figure 5:
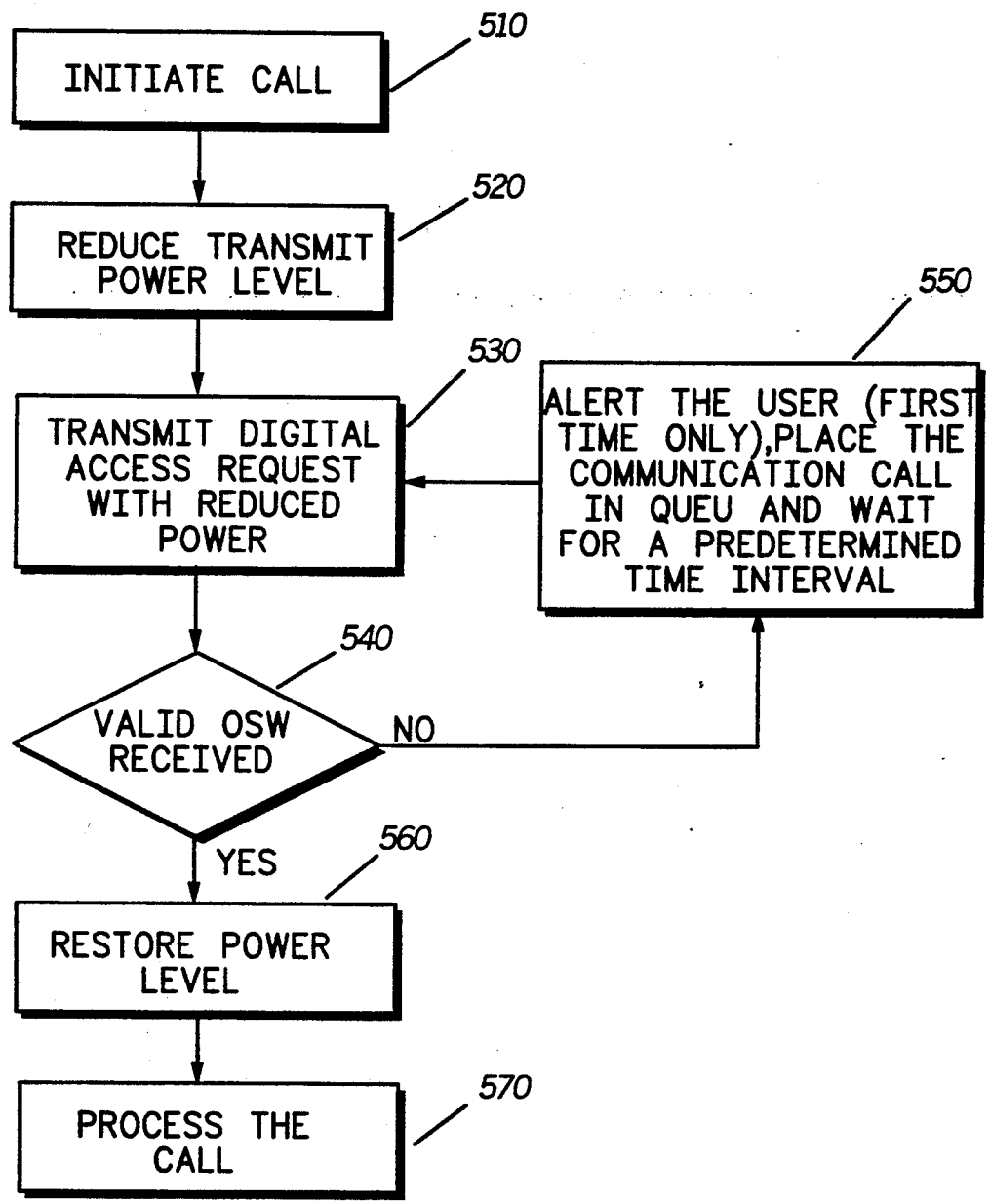
FIG. 5 is a flow chart of the steps taken for achieving the intended results of yet another embodiment of the present invention.

Referring to FIG. 5, the preferred flow chart of the operational steps according to yet another embodiment of the invention is shown. Because transmit power required for establishing digital communication is substantially less than the transmit power required for establishing analog communication, after initiation of the call, the transmit power of the communication unit 120 during transmission of the digital access code is reduced to a predetermined power level such that a substantially identical likelihood of success for establishing digital communication and tone signalling communication is provided, blocks 510, 520 and 530. The predetermined power level is selected based on the particular characteristics of the coverage area of the communication system 100 which insures establishment of successful analog communication. If after the transmission of the digital access request a valid OSW is received from the resource communication controller 110, block 540, the power level is restored, block 560, and the analog communication is processed, block 570. If a valid OSW is not received, block 540, the initiated communication call is placed in queue and operator is alerted via audio and visual indicator means, block 550. Thereafter, the transmit power of the communication unit is reduced and the digital access request is periodically transmitted until analog communication with the communication resource controller 110 is established. It may be appreciated that based on any criteria, such as passage of a predetermined time interval, the attempts to establish analog communication may be aborted. In the preferred embodiment of the invention the predetermined reduced power is stored in the EEPROM 235. The predetermined reduced power level may be stored in the EEPROM 235 permanently and may not be subject to modification. Alternatively, the predetermined reduced power level may be modifiable via the OSW messages transmitted from the communication resource controller 110.

It is well known that the steps taken for achieving the intended result of the present invention are programmed as instructions which are executable by the controller 220. The programming of these instructions is well known in the art and may be achieved by a programmer with the knowledge of the instructions of a specific controller.

What is claimed is:

1. In a communication system including a communication resource controller capable of establishing analog communication and synchronous digital communication with at least one communication unit, wherein the likelihood of success for establishing digital communication is substantially greater than the likelihood of success for establishing analog communication, said analog communication being established after a digital access request message transmitted from said communication unit is received by said communication resource controller during an access time interval, a method for establishing an analog communication by said communication unit comprising the steps of:
   (a) measuring a received signal quality characteristic from said communication resource controller;
   (b) comparing said received signal quality characteristic to a predetermined received signal quality characteristic which is determined to make analog communication substantially likely;
   c) transmitting said digital access request message when analog communication with said communication resource controller is substantially likely.

2. The method of claim 1, wherein said steps (a) and (b) comprise the steps of:
   (a) determining a received signal strength level;
   (b) comparing said received signal strength level to a predetermined received signal strength level which makes establishing analog communication substantially likely.

3. In a communication system including a communication resource controller capable of establishing analog message and synchronous digital communication with at least one communication unit, wherein the likelihood of success for establishing digital communication is substantially greater than the likelihood of success for establishing analog communication, said analog communication being established after a digital access request message transmitted from said communication unit is received by said communication resource controller during an access time interval, a method for establishing an analog communication by said communication unit comprising the steps of:
   a) delaying transmission of said digital access request message during said access time interval such that likelihood of success for establishing digital communication is substantially identical to likelihood of success for establishing analog communication;
   b) periodically transmitting said delayed digital access request message until analog communication with said communication resource controller is established.

4. In a communication system including a communication resource controller capable of establishing analog message and synchronous digital communication with at least one communication unit, wherein the likelihood of success for establishing digital communication is substantially greater than the likelihood of success for establishing communication, said analog communication being established after a digital access request message transmitted from said communication unit is received by said communication resource controller during an access time interval, a method for establishing an analog communication by said communication unit comprising the steps of:
   a) reducing transmitter power during said access time interval such that likelihood of success for establishing digital communication is substantially identical to likelihood of success for establishing analog communication;
   b) periodically transmitting said digital access request message until analog communication with said communication resource controller is established.

5. In a communication system including a communication resource controller capable of establishing analog message and synchronous digital communication with at least one communication unit, wherein the likelihood of success for establishing digital communication is substantially greater than the likelihood of success for establishing analog communication, said analog communication being established after a digital access request message transmitted from said communication unit is received by said communication resource controller, said communication unit comprising:
   determination means for determining a received signal quality characteristic of signals received from said communication resource controller;
   comparison means responsive to said determination means for comparing said received signal quality characteristic to a predetermined received signal quality characteristic which determines that establishing analog communication is substantially likely;
   transmission means responsive to said comparison means for transmitting said digital access request message when analog communication with said communication resource controller is substantially likely.

6. The apparatus of claim 5, wherein said determination means for determining a received signal quality characteristic comprise means for determining a received signal strength level.

7. In a communication system including a communication resource controller capable of establishing analog message and synchronous digital communication with at least one communication unit, wherein the likelihood of success for establishing digital communication is substantially greater than the likelihood of success for establishing analog communication, said analog communication being established after a digital access request message transmitted from said communication unit is received by said communication resource controller during an access time interval, said communication unit, comprising:

delay means for delaying transmission of said digital access request message during said access time interval such that likelihood of success for establishing digital communication is substantially identical to likelihood of success for establishing analog communication;

transmission means for transmitting said delayed digital access request message until analog communication with said communication resource controller is established.

8. In a communication system including a communication resource controller capable of establishing analog message and synchronous digital communication with at least one communication unit, wherein the likelihood of success for establishing digital communication is substantially greater than the likelihood of success for establishing analog communication, said analog communication being established after a digital access request message transmitted from said communication unit is received by said communication resource controller during an access time interval, said communication unit comprising:

means for reducing transmitter power during said access time interval such that likelihood of success for establishing digital communication is substantially identical to likelihood of success for establishing analog communication;

means for transmitting said digital access request message until analog communication with said communication resource controller is established.

* * * * *